US006105601A

United States Patent [19]

Wang

[11] Patent Number: 6,105,601

[45] Date of Patent: Aug. 22, 2000

[54] INFLATION DEVICE COMPRISING A CONNECTION HEAD COMPATIBLE WITH INFLATION VALVES OF U.S. TYPE AND FRENCH TYPE

[76] Inventor: Lopin Wang, 16F-2, No. 17, Lane 52, Sec. 3, Je-He Road, Taichung, Taiwan

[21] Appl. No.: 09/411,159

[22] Filed: Oct. 1, 1999

[51] Int. Cl.[7] ..................................................... F16K 15/20

[52] U.S. Cl. ........................ 137/231; 251/149.6; 251/250

[58] Field of Search ............................. 251/149.6, 149.1, 251/250; 137/223, 231; 285/312, 346

[56] References Cited

U.S. PATENT DOCUMENTS

| | | | |
|---|---|---|---|
| 943,416 | 12/1909 | Judkins | 285/346 |
| 1,214,664 | 2/1917 | Feleki | 251/250 X |
| 1,784,822 | 12/1930 | Crowley | 251/149.6 |
| 2,931,615 | 4/1960 | Campbell | 251/250 X |
| 5,342,018 | 8/1994 | Wu | 251/250 |
| 5,346,173 | 9/1994 | Rasmusson | 251/250 X |
| 5,762,095 | 6/1998 | Gapinski et al. | 137/223 |
| 5,960,815 | 10/1999 | Wang | 137/231 X |
| 5,975,109 | 11/1999 | Wu | 137/231 |
| 5,983,920 | 11/1999 | Gapinski et al. | 137/231 |

*Primary Examiner*—John Rivell
*Assistant Examiner*—Meredith H. Schoenfeld
*Attorney, Agent, or Firm*—Browdy and Neimark

[57] ABSTRACT

An inflation device is provided with a connection head which comprises a housing with a receiving compartment. The receiving compartment is provided at one end thereof with a holding port, and an elastic block corresponding in location to one end of the holding port and having a through hole similar in construction to a fisheye hole. The through hole has a large diametrical end split with the holding port. The receiving compartment is further provided therein with a displacement member which has an inner end pressing against the elastic block, and an outer end located at the open end of the receiving compartment. The displacement member has a through hole split with the small diametrical end of the through hole of the elastic block, and an air guide hole extending from the periphery of the displacement member to communicate with the through hole. A slide member is formed of a press body located in the through hole, and a pliable strip extending through the through hole whereby the pliable strip is provided at a tail end thereof with a rack engageable with a gear which is pivoted to the outer end of the displacement member. The slide member is urged by an elastic member toward the inner end of the displacement member. The housing is further provided with a handle which is pivoted to the open end of the receiving compartment such that the handle can be swiveled to press against the displacement member.

5 Claims, 4 Drawing Sheets

INFLATION DEVICE COMPRISING A CONNECTION HEAD COMPATIBLE WITH INFLATION VALVES OF U.S. TYPE AND FRENCH TYPE

FIELD OF THE INVENTION

The present invention relates generally to an inflation device, and more particularly to an inflation device comprising a head capable of an automatic adjustment to fit an inflation valve of the U.S. type or the French type.

BACKGROUND OF THE INVENTION

The bicycle tire is generally provided with an air valve of the U.S. type or the French type. For this reason, two kinds of the bicycle air pumps must be used to inflate the bicycle tire. Certain conventional bicycle air pumps are provided with two connection heads which are respectively compatible with the air valve of the U.S. type or the French type. For example, the U.S. patent Ser. No. 08/903,444 discloses an inflation device comprising two connection heads which are respectively adapted for the air valve of the U.S. type or the French type. However, the inflation device is not user-friendly.

SUMMARY OF THE INVENTION

The primary objective of the present invention is to provide an inflation device which comprises a head adapted to the tire air valves of both the U.S. type and the French type. The inflation device of the present invention is easy to use.

In keeping with the principle of the present invention, the foregoing objective of the present invention is attained by an inflation device comprising a head which is formed of a housing, an elastic block, a displacement member, a gear, a slide member, an elastic member, and a pivot handle. The housing has a long receiving compartment which is provided with an open end, at other end thereof with a holding port in communication with atmospheric air, and an air inlet. The elastic block is disposed in the receiving compartment such that the elastic block is corresponding in location to one end of the holding port. The elastic block has a large diametrical hole and a small diametrical hole extending through the elastic block from the underside of the large diametrical hole. The displacement member is disposed in the receiving compartment such that the displacement member displaces along the longitudinal direction of the receiving compartment, and that the inner end of the displacement member remains in contact with the elastic block, and further that the outer end of the displacement member is located at the open end of the receiving compartment. The displacement member has a through hole split with the small diametrical hole of the elastic block, and at least one air guide hole extending from the periphery thereof to communicate with the through hole. The gear is pivoted to the outer end of the displacement member. The slide member has a press body, which is located in the through hole of the displacement member to displace along the longitudinal direction of the through hole. The press body is provided with a pliable strip extending outward from one end thereof corresponding to the outer end of the displacement member. The pliable strip is provided in the proximity of the tail end thereof with a rack which is engaged with the gear. The elastic member has one end pressing against the housing, and other end urging the slide member in the direction toward the holding port. The pivot handle is pivoted to the housing such that the pivot handle is corresponding in location to the open end of the receiving compartment. The pivot handle has a first press portion and a second press portion. The distance between the first press portion and a pivot of the pivot handle is smaller than the distance between the second press portion and the pivot. The pivot handle is capable of swiveling between a standby position and an operation position such that the outer end of the displacement member is pressed against by the first press portion at the standby position, and by the second press portion at the operation position. The pivot handle has an arcuate rack, which is engaged with the gear.

DETAILED DESCRIPTION OF THE INVENTION

Figure 1:
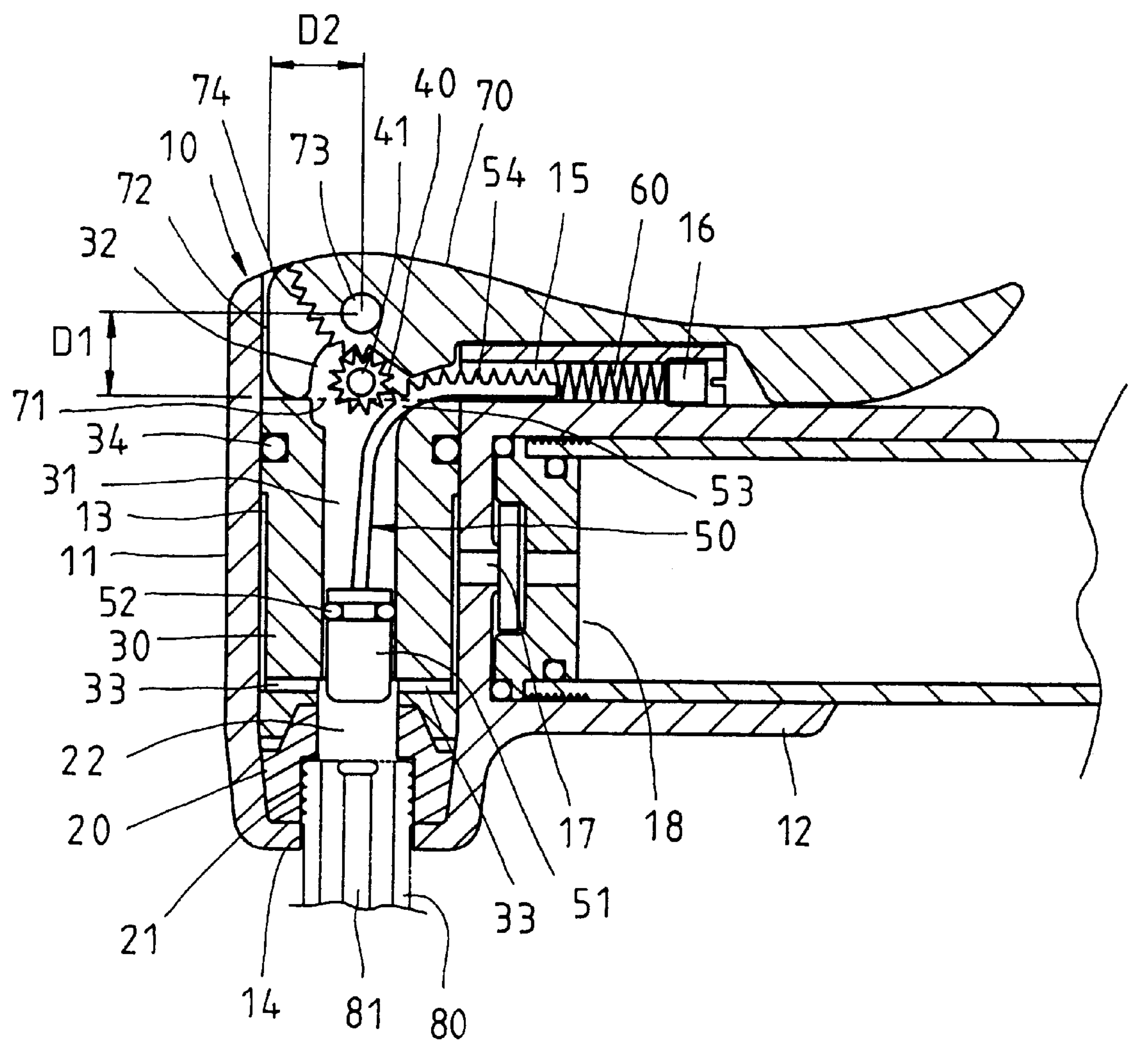
FIGS. 1 and 2 are schematic views of the operation of the inflation valve of the U.S. type of a preferred embodiment of the present invention.

As shown in all drawings provided herewith, a connection head of an inflation device of the preferred embodiment of the present invention comprises a housing 10, an elastic block 20, a displacement member 30, a gear 40, a slide member 50, an elastic member 60, and a pivot handle 70.

The housing 10 is formed of a cylindrical body 11 and a tubular body 12 perpendicular to the cylindrical body 11. The cylindrical body 11 is provided therein with a receiving compartment 13 of a cylindrical shape. The receiving compartment 13 has an open top end and a bottom end which is provided with a holding port 14 in communication with atmospheric air. The tubular body 12 is provided in the outer peripheral surface thereof with a tubular compartment 15 corresponding to the side of the open end of the receiving compartment 13. The tubular compartment 15 has one end, which is located farther from the cylindrical body 11 and is locked by a bolt 16. The tubular body 12 can be directly fastened with the cylinder tube of a hand-held air pump. The tubular body 12 may be also fastened with a hose which is connected with the air pump. The tubular body 12 is provided therein with a check valve 18 which allows air to enter the receiving compartment 13 from the cylinder tube of the air pump such that air is prevented from flowing into the cylinder tube of the air pump from the air inlet 17 of the receiving compartment 13.

The elastic block 20 is made of rubber and disposed at the bottom end of the receiving compartment 13 such that the outer surface of the elastic block 20 presses against the wall of the receiving compartment 13. The elastic block 20 is provided with a large diametrical hole 21 extending upwards from the bottom thereof and split with the holding port 14. The elastic block 20 is further provided with a small diametrical hole 22 extending through the elastic block 20 from the bottom of the large diametrical hole 21. The inner diameters of the large diametrical hole 21 and the small diametrical hole 22 are slightly greater than the outer diameters of the inflation valves of the U.S. type and the French type.

The displacement member 30 is of a cylindrical construction and is disposed in the receiving compartment 13. The displacement member 30 has a bottom end which presses against the elastic block 20 in a complementary manner, and a top end which is located at the open end of the receiving compartment 13. The displacement member 30 has a through hole 31 extending along the longitudinal direction thereof and having a bottom end split with the small diametrical hole 22 of the elastic block 20. The through hole 31 is provided at the top end thereof with two wall plates 32 opposite to each other and embracing the end of the hole. The displacement member 30 is provided respectively in two opposite sides of the proximity of the bottom end thereof with an air guide hole 33 extending inwards to communicate with the through hole 31. The displacement member 30 is provided in the outer peripheral surface of the top end thereof with a large leakproof ring 34.

The gear 40 is pivoted by a pivot 41 between the two wall plates 32 located at the top end of the displacement member 30.

The slide member 50 has a press body 51 of a cylindrical construction and is located in the through hole 31 of the displacement member 30. The slide member 50 is provided on the outer peripheral surface thereof with a small leakproof ring 52. The press body 51 is provided with a pliable strip 53 extending from the top thereof to enter arcuately the tubular compartment 15 of the housing 10 via the through hole 31. The slide member 50 is provided in the tail half section thereof with a rack 54 engageable with the gear 40.

The elastic member 60 is a coil spring and is disposed in the tubular compartment 15 of the housing 10 such that one end of the elastic member 60 urges the bolt 16, and that other end of the elastic member 60 urges the tail end of the pliable strip 53 of the slide member 50.

Figure 2:
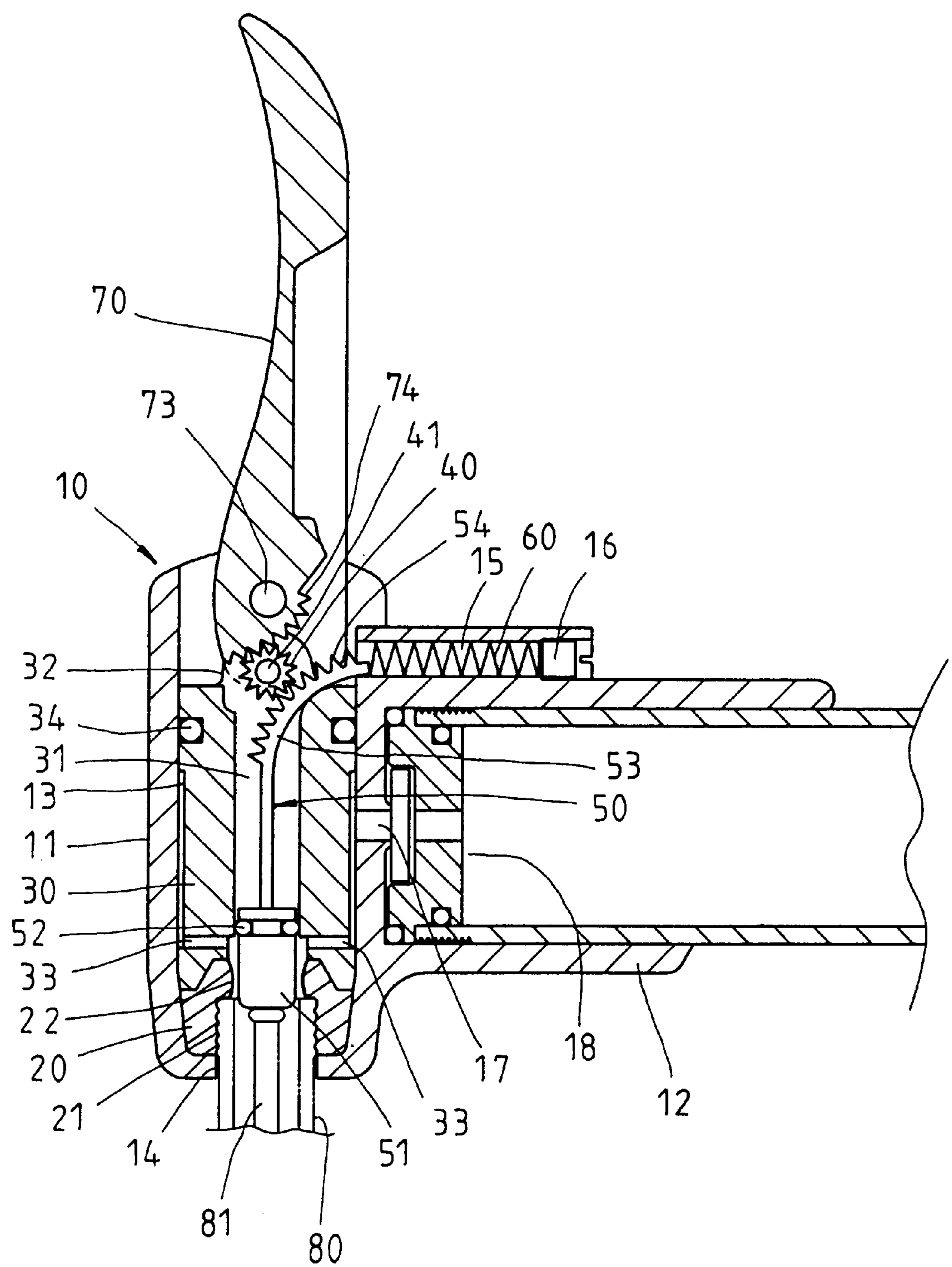
Figure 3:
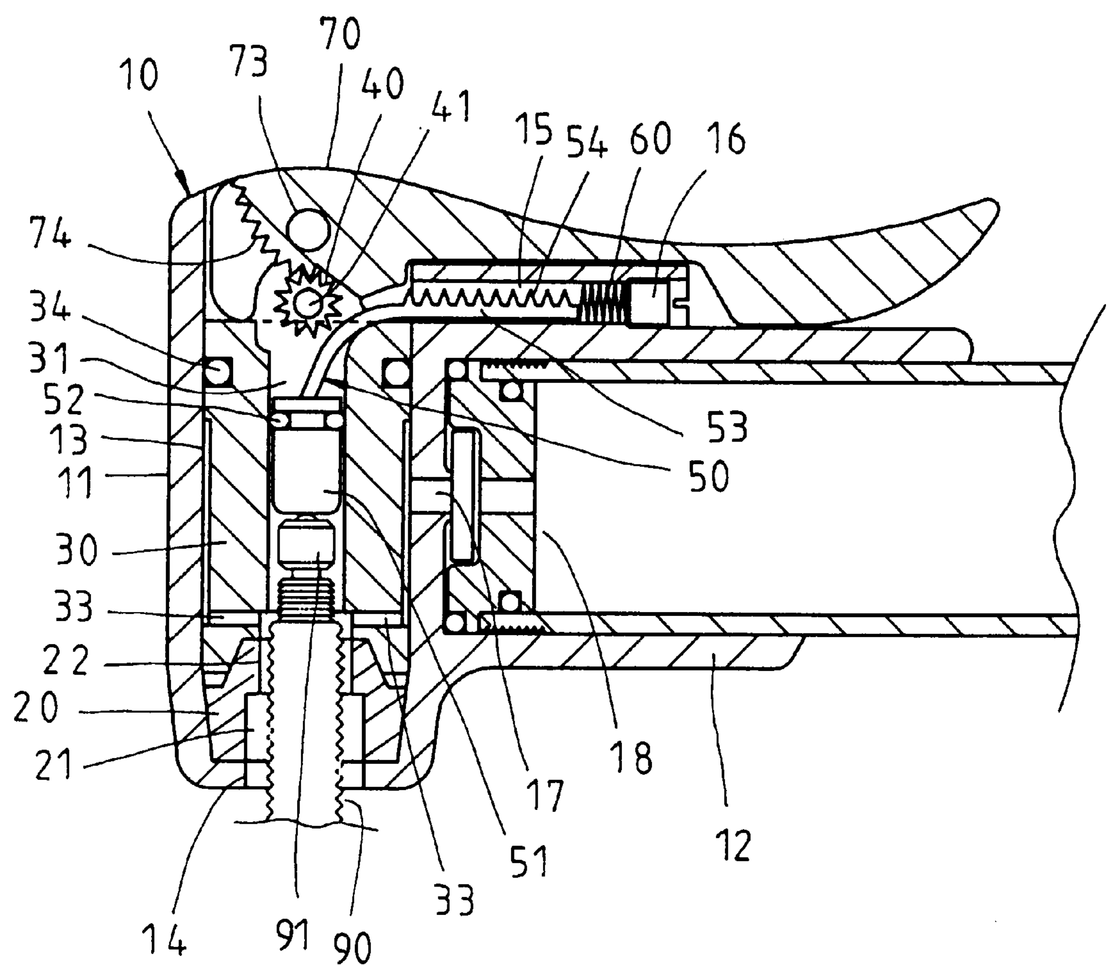
FIGS. 3 and 4 are schematic views of the operation of the inflation valve of the French type of the preferred embodiment of the present invention.
Figure 4:
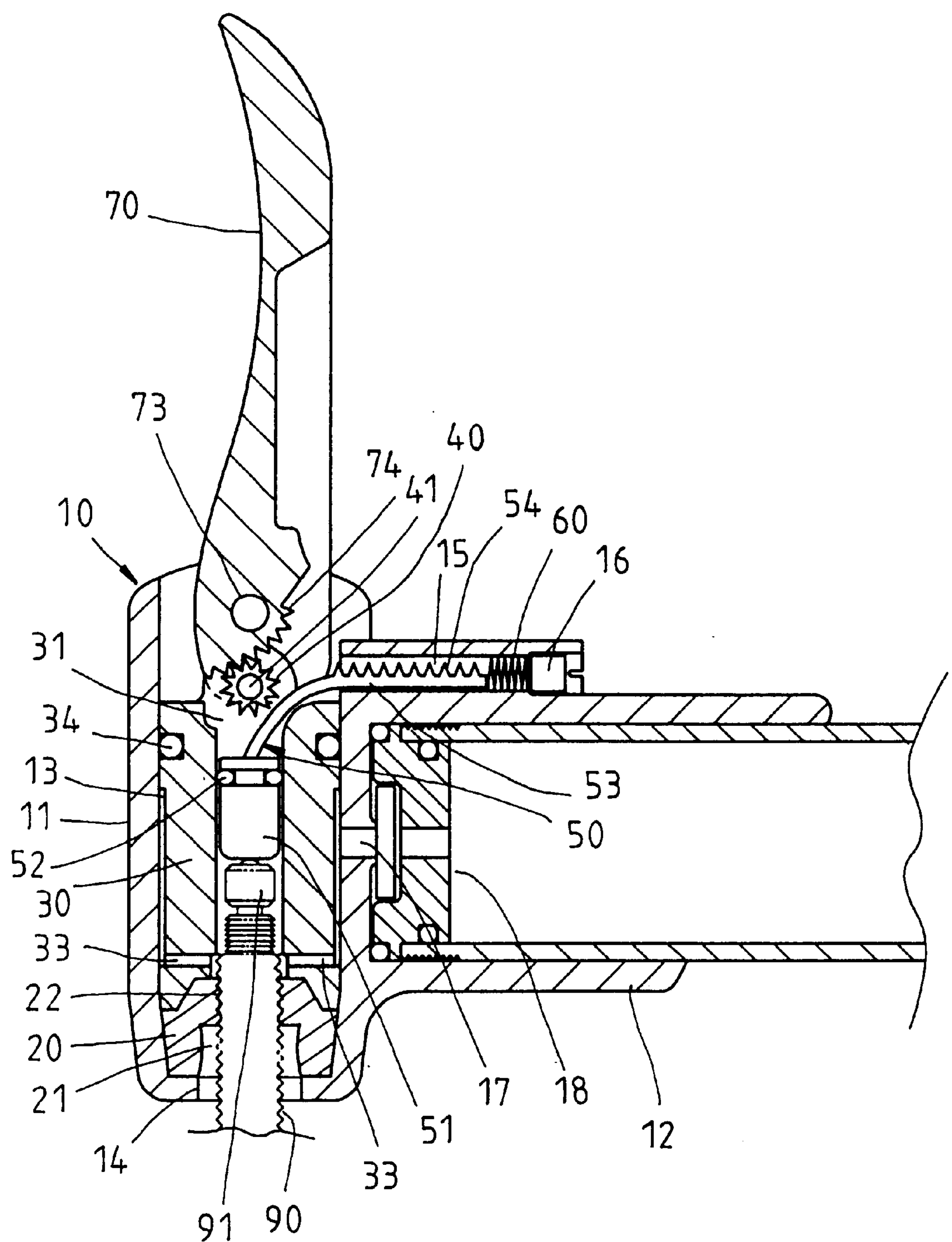

The pivot handle 70 is pivoted by a pivot 73 to the top side of the cylindrical body 11 such that the pivot handle 70 is capable of swiveling between a standby position as shown in FIGS. 1 and 3, and an operation position as shown in FIGS. 2 and 4. When the pivot handle 70 is located at the above two positions, the first press portion 71 and the second press portion 72 press respectively against the top of the displacement member 30. The vertical distance D2 between the second press portion 72 and the pivot 73 is greater than the vertical distance D1 between the first press portion 71 and the pivot 73, as shown in FIG. 1. In other words, when the handle 70 is swiveled to located at the operation position, the displacement member 30 can be pressed against by the handle 70. The handle 70 is further provided with an arcuate rack 74 engageable with the gear 40.

When the connection head of the present invention is not at work, the press body 51 is located in the lower end of the through hole 31 in view of the slide member 50 being urged by the elastic member 60. In the meantime, the innermost tooth of the rack 54 on the pliable strip 53 comes in contact with the gear 40. When the connection head is in use, as shown in FIGS. 1 and 2, the holding port 14 of the cylindrical body 11 is engaged with an inflation valve 80 of an object to be inflated. In case of the inflation valve of the U.S. type, which is greater in diameter than that of the French type, the inflation valve 80 is stopped at the shoulder between the large diametrical hole 21 and the small diametrical hole 22 of the elastic block 20, as shown in FIG. 1. As the handle 70 is swiveled to the operation position, the displacement member 30 is pressed against by the handle 70 so as to compress the elastic block 20, which is thus deformed to hold securely the inflation valve 80, as shown in FIG. 2. When the handle 70 is swiveled from the standby position to the operation position, the gear 40 is driven by the arcuate rack 74 to turn such that the gear 40 in motion can engage the rack 54 of the slide member 50 which is urged by the elastic member 60. As a result, the slide member 50 is actuated to slide toward the bottom end of the displacement member 30 such that the press body 51 of the slide member 50 displaces downward to press against an air valve bar 81 of the inflation valve 80 of the U.S. type, thereby causing the inflation valve 80 to remain in the open state. The air in the object being inflated can not escape, thanks to the check valve 18, the large leakproof ring 34, and the small leakproof ring 52, as shown in FIG. 2. The air generated by the inflation device is guided to enter the receiving compartment 13 via the air inlet 17, and then into the through hole 31 via the air guide hole 33 of the displacement member 30. The air is finally injected via the small diametrical hole 22 of the elastic block 20 into the object being inflated. Upon completion of the inflating of the object, the handle 70 is swiveled back to the standby position such that the displacement member 30 is urged upwardly by the elastic block 20, and that the slide member 50 is caused to return to its original position of FIG. 1 by the gear 40 in reverse motion, thereby resulting in the withdrawal of the press body 51 from the air valve bar 81 of the inflation valve 80.

Now referring to FIGS. 3 and 4, the inflation valve 90 of the French type is shown being inserted into the through hole 31 of the displacement member 30 via the small diametrical hole 22 of the elastic block 20 such that the press body 51 of the slide member 50 is pushed by the inflation valve 90 to slide inwards so as to cause the rack 54 on the pliable strip 53 to remain apart from the gear 40. In the meantime, the air valve bar 91 of the inflation valve 90 is pressed against by the press body 51 so as to keep the inflation valve 90 in the open state, as shown in FIG. 3. As the handle 70 is swiveled to the operation position from the standby position, the displacement member 30 is pressed against by the handle 70, thereby resulting in the deformation of the elastic block 20. The inflation valve 90 is thus held securely by the deformed elastic block 20. In the meantime, the slide member 50 is not linked by the gear 40, as shown in FIG. 4. The air generated by the inflation device is guided into the through hole 31 via the air guide hole 33 of the receiving compartment 13. The air is injected into the inflation valve 90 via the through hole 31.

What is claimed is:

1. A connection head of an inflation device, said connection head comprising:

a housing with a receiving compartment, said receiving compartment being provided with an open end, and at other end thereof with a holding port in communication with atmospheric air, said receiving compartment being further provided in a peripheral wall thereof with an air inlet;

an elastic block disposed in said receiving compartment such that said elastic block is corresponding in location to one end of said holding port whereby said elastic block has a large diametrical hole corresponding in location to said holding port, and a small diametrical hole extending through said elastic block from underside of said large diametrical hole;

a displacement member disposed in said receiving compartment such that said displacement member displaces along a longitudinal direction of said receiving compartment, and that an inner end of said displacement member remains in contact with said elastic block, and further that an outer end of said displacement member is located at said open end of said receiving compartment, said displacement member having a through hole and at least one air guide hole, with said through hole being split with said small diametric hole of said elastic block, with said air guide hole extending from a periphery of said displacement member to communicate with said through hole;

a gear pivoted to the outer end of said displacement member;

a slide member having a press body which is located in said through hole of said displacement member such that said press body displaces along a longitudinal direction of said through hole, said press body provided with a pliable strip extending outward from one end thereof and corresponding in location to the outer end of said displacement member, said pliable strip provided in the proximity of a tail end thereof with a rack engageable with said gear;

an elastic member having one end urging said housing, said elastic member further having other end which urges said slide member in the direction toward said holding port; and a handle pivoted by a pivot to said housing such that said handle is corresponding in location to said open end of said receiving compartment, said handle having a first press portion and a second press portion such that the distance between said first press portion and said pivot is smaller than the distance between said second press portion and said pivot, said hand capable of swiveling between a standby position and an operation position such that said first press portion presses against the outer end of said displacement member at such time when said handle is located at said standby position, and that said second press portion presses against the outer end of said displacement member at such time when said handle is located at said operation position, said handle having an arcuate rack which is engaged with said gear whereby said gear is driven to turn at the time when said handle swivels.

2. The connection head as defined in claim 1, wherein receiving compartment is of a cylindrical construction; wherein said displacement member is of a cylindrical construction and is provided on a periphery thereof with a leakproof ring whereby said leakproof ring is located between said air inlet and said open end of said receiving compartment at the time when said displacement member displaces in said receiving compartment.

3. The connection head as defined in claim 1, wherein said displacement member has one end which is corresponding to said open end of said receiving compartment and is provided with two wall plates opposite to each other and embracing an open end of said through hole; and wherein said gear is pivoted by a pivot between said two wall plates.

4. The connection head as defined in claim 1, wherein said open end of said receiving compartment of said housing is provided with a tubular compartment perpendicular to said receiving compartment and having an open end facing said receiving compartment, said tubular compartment further having a closed end; wherein said pliable strip of said slide member has a tail end extending into said tubular compartment; and wherein said elastic member is a coil spring which is disposed in said tubular compartment such that one end of said coil spring urges the closed end of said tubular compartment, and that other end of said coil spring urges the tail end of said pliable strip.

5. The connection head as defined in claim 1, wherein said press body of said slide member is provided on a periphery thereof with a leakproof ring fastened therewith whereby said leakproof ring is located between said air guide hole and one end of said through hole at the time when said slide member displaces in said through hole, said one end of said through hole being corresponding in location to said open end of said receiving compartment.

* * * * *